Aug. 21, 1934.  W. J. MAUST  1,970,967
TRAILER LIFT
Filed March 6, 1933  2 Sheets-Sheet 1
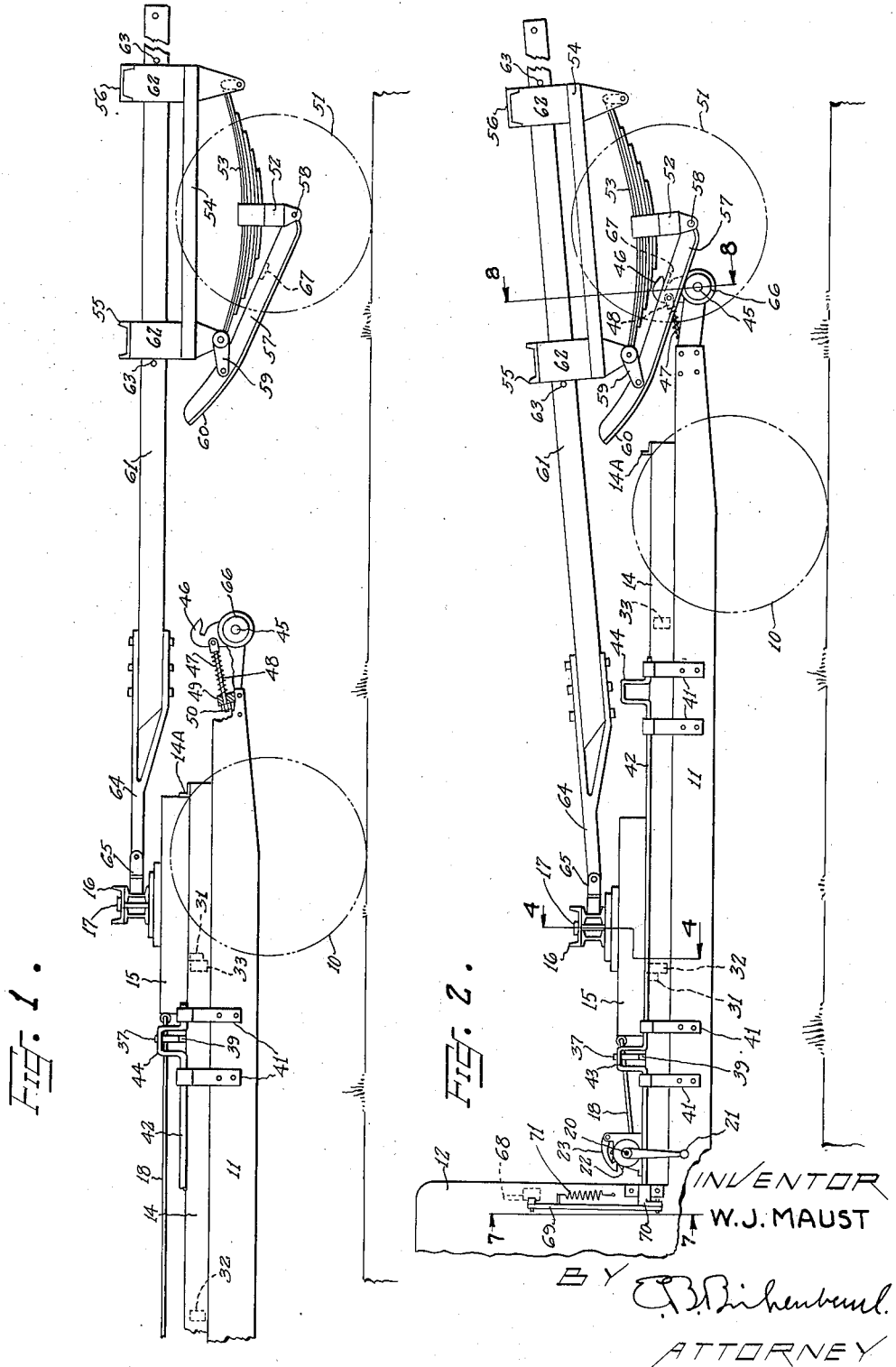
INVENTOR
W. J. MAUST
BY
ATTORNEY Aug. 21, 1934.  W. J. MAUST  1,970,967
TRAILER LIFT
Filed March 6, 1933  2 Sheets-Sheet 2
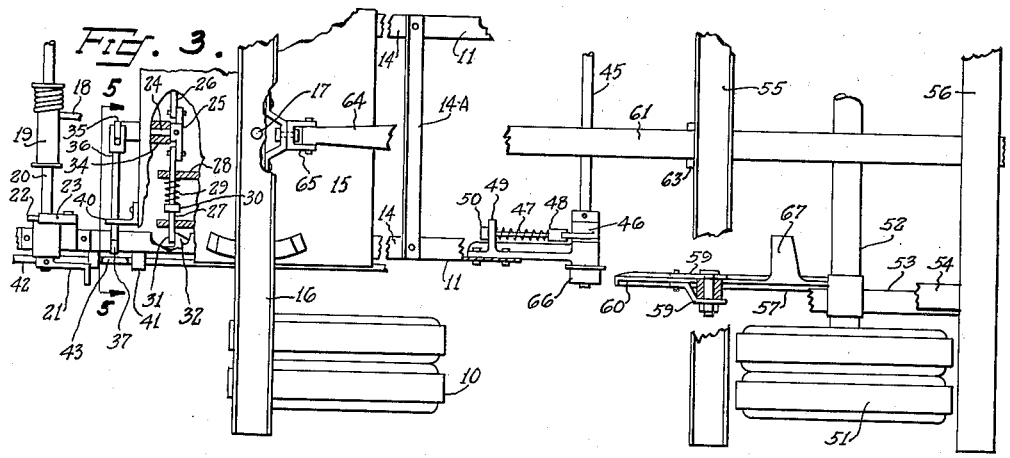
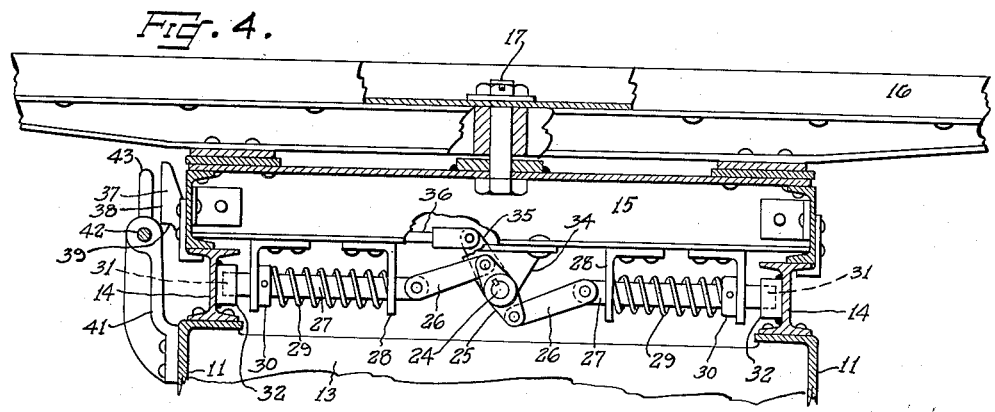
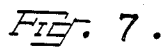
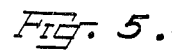
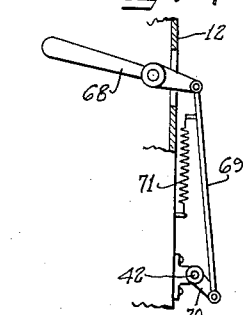
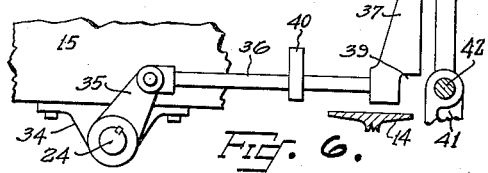
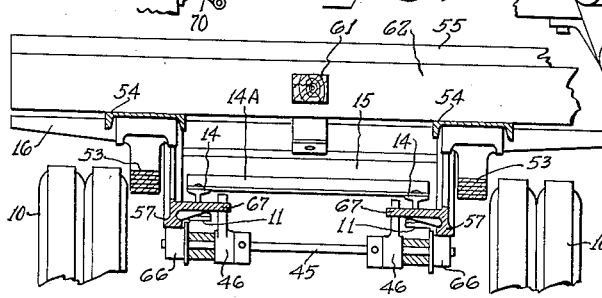
INVENTOR
W. J. MAUST
BY
ATTORNEY Patented Aug. 21, 1934

1,970,967

UNITED STATES PATENT OFFICE 1,970,967

TRAILER LIFT

William J. Maust, Bly, Oreg.

Application March 6, 1933, Serial No. 659,643

8 Claims. (Cl. 214—65)

This invention relates generally to trailers for land traveling vehicles, and particularly to a trailer lift.

The main object of this invention is the provision of an improved form of trailer lift especially adapted for logging operations wherein the trailer can be loaded upon the truck while traveling without load for the purpose of facilitating the maneuvering thereof.

The second object is the construction of an improved form of trailer lift which will be inexpensive to manufacture, require little maintenance and greatly speed up log transporting operations thereby reducing the cost of transportation per thousand board feet of logs transported.

The third object is to so construct the device that its operation is entirely within control of the truck driver who may with the minimum amount of effort load the trailer wheels and their supported structure upon the truck itself for transportation purposes.

These, and other objects, will become more apparent from the specification following as illustrated in the accompanying drawings, in which:

Fig. 1 is a fragmentary side elevation showing the rear end of the truck and the following trailer resting upon the ground.

Fig. 2 is a side elevation showing the trailer loaded upon the truck.

Fig. 3 is a fragmentary plan with parts broken away in section.

Fig. 4 is a section taken along the line 4—4 in Fig. 2.

Fig. 5 is a section taken along the line 5—5 in Fig. 3 showing the parts in a latched position.

Fig. 6 is a view similar to Fig. 5 but showing the parts in an unlatched position.

Fig. 7 is a section taken along the line 7—7 in Fig. 2.

Fig. 8 is a section taken along the line 8—8 in Fig. 2.

Similar numbers of reference refer to similar parts throughout the several views.

Referring in detail to the drawings, there is shown the rear wheels 10 of a truck as well as the chassis frame 11 and a portion of the cab 12, also the cross ties 13 between the sides of the frame 11. On the frame 11 are mounted the parallel guides 14 which, in this instance, are in the form of I beams upon the top side of which is slidably mounted a carriage 15 on which is supported a bunk 16 which is pivotally held to the carriage 15 by the king bolt 17. A transverse angle bar 14—A secured across the members 14 forms a stop for the carriage 15.

Attached to the carriage 15 is a cable 18 which is wound on the drum 19 whose shaft 20 may be rotated by means of a hand crank 21 (as shown) or by means of reduction gearing from the motive power of the truck itself. It is also desirable to provide a ratchet wheel 22 and pawl 23 by means of which the wheel may be held in any desired position against a rearward movement of the carriage 15.

On the underside of the carriage 15 is secured a longitudinal shaft 24 on which is mounted a cross lever 25 from whose opposite ends extend the links 26 to the latching plungers 27 which guide in the brackets 28 secured on the under side of the carriage 15. Each plunger 27 is urged outwardly by means of a spring 29 which bears against the collar 30 pinned on the plunger 27. The outer end 31 of each plunger 27 constitutes a latch, each of which is capable of engaging its respective forward lug 32 or rearward lug 33.

The shaft 24 journals in the brackets 34 which are secured to the under side of the carriage 15. On the forward end of the shaft 24 is secured a lever 35 which is joined by the rod 36 to an upright arm 37, the lower end of whose face 38 is provided with an off-set 39. The rod 36 slides in the guide 40.

Journaling in the brackets 41 which are secured on one side of the frame 11 is a crank shaft 42 having the off-set portions 43 and 44.

On the rear end of the frame 11 is secured a transverse shaft 45 on which is mounted a pair of hooks 46 which are urged rearwardly by means of a spring 47 placed around a bolt 48 whose forward end is attached to the hook 46 and whose rearward end guides in the lug 49 against which the nut 50 stops, providing thereby a yielding support for the hooks 46 tending to hold them to an upright position although permitting same to yield under the forcible engagement with another member.

Turning now to the trailer itself same will be seen to consist of a pair of wheels 51 on whose axle 52 are supported the springs 53 which, in turn, support the trailer body 54 on the upper side of which are the bunks 55 and 56. Projecting forwardly from each end of the rear axle 52 is a runner 57 which is hinged to the axle 52 by means of a pin 58, while the forward end of each runner 57 is supported by a shackle link 59 from the forward end of its respective spring 53.

The forward end 60 of each runner 57 is preferably curved forwardly. A reach 61 passes slidably through the bolsters 62 of the trailer body 54 for the purpose of accommodating the device to the hauling of extra long logs; but for the purpose of describing this invention same will be referred to as fixed by means of the pins 63. The forward end 64 of the reach 61 is joined by a universal connection 65 to the bunk 16.

On the shaft 45 and in alignment with the runners 57 are the rollers 66. On each runner 57 and in alignment with the hooks 46 is a laterally turned lug 67.

In the cab 12 is a hand lever 68 to which is attached a connecting link 69 which is joined to a lever 70 which, in turn, is secured on the forward end of the crank shaft 42. A spring 71 is provided to urge the operating end of the lever 68 upwardly and to hold the parts in the position shown in Figs. 5 and 7. If the lever 68 is depressed the parts will move to the position shown in Fig. 6, where they will remain until the loading operation is under way.

The operation of the device is as follows: Assuming the parts to be in the position shown in Fig. 1, namely in which the trailer wheels 51 are resting on the ground and it is desired to load the trailer on the truck, it is only necessary for the driver to depress the lever 68 and proceed with the loading operation, either by backing the trailer into a tree or bank in case no hauling device is provided, or by operating the crank 21 in a direction to haul the carriage 15 toward the cab, it being remembered that the operation of the lever 68 has caused the off-set portion 44 of the crank shaft 42 to engage the arm 37 and rock the shaft 24 thereby withdrawing the plunger ends 31 which permits the cable 18 to haul the trailer toward the truck until the runner and end 60 engage the rollers 66, after which a continued hauling action of the cable 18 will elevate the entire trailer to the position shown in Fig. 2.

It will be noted that after the commencement of the forward movement of the trailer occasioned by a forward movement of the carriage 15 that the arm 37 is disengaged from the off-set 44 which is now free to return to the position shown in Fig. 5.

When the carriage 15 has reached the forward limit of its travel the plunger ends 31 automatically latch behind their respective lugs 32. At the same time the lugs 67 engage the hooks 46 which hold the runners 57 against their respective rollers 66 and prevent the trailer from bouncing around on the rear end of the truck.

When it is desired to unload the trailer it is only necessary to operate the lever 68 for the purpose of withdrawing the latches 31 from the lugs 33, and either lower the trailer under the control of the crank 21 or to merely release the pawl 23 and permit the trailer to coast down on the rollers 66 without retarding the action in any manner. In some instances it will be found desirable to provide a brake for the shaft 20, although this is by no means necessary.

No special means is provided for insuring the absolute alignment of the runners 57 with the rollers 66 during the loading operation, this being accomplished in the easiest possible manner by the driver orienting his truck so that his propeller shaft will be in alignment with the reach 61.

Where logs of unusual length are hauled it will of course be necessary to move the trailer with relation to the reach 61 before the loading operation and after the unloading operation—that is, while the trailer is on the ground.

I claim:

1. A log hauling vehicle having in combination a truck, a two wheel trailer having the same gage as said truck provided with a reach having its forward end mounted on said truck when transporting a load, and means for moving said trailer upon said truck for transportation purposes when empty.

2. A log hauling device having in combination a truck having rollers at the rear end thereof, a two wheel trailer of the same gage as said truck and having a reach slidably mounted on said truck and having fixed inclined runners supported by said trailer on the inner side of its wheels whereby a forward movement of said trailer with relation to said truck will cause said runners to ride upon said rollers in a manner to elevate said trailer above the ground in an unloaded position, and means for holding said truck in fixed relationship to said trailer in loaded and unloaded positions.

3. The substance of claim 2, and means for moving said trailer forward with relation to said truck.

4. A log hauling device having in combination a truck, a carriage longitudinally slidable thereon and having a logging bunk supported on said carriage, a trailer mounted behind said truck also carrying logging bunks and having a reach universally connected to said carriage, said trailer having inclined runners on the under side thereof free of the roadway, said truck having rollers thereon in the path of said runners whereby a movement of said trailer toward said truck will cause said runners to ride upon said rollers and elevate said trailer, a latch for holding said trailer in a fully elevated position, and means for holding said runners against said rollers when in an elevated position.

5. The substance of claim 4, and means for holding said trailer in a load-carrying position with its wheels upon the ground and at a maximum distance from said truck.

6. The substance of claim 4, and means for releasably holding said trailer in a load-carrying or in a loaded position.

7. The combination of a truck having a pair of rollers extending from the rearward end thereof, and a two wheel trailer having fixed inclined runners on the under side thereof in the path of said rollers whereby a movement of said trailer toward said truck will raise said trailer from the ground, and means for drawing said trailer forward with relation to said truck including means for releasably holding said trailer in a foremost unloaded position.

8. The substance of claim 7, and means for actuating said release mechanism from the truck cab.

WILLIAM J. MAUST.